(12) United States Patent
Saitoh

(10) Patent No.: US 8,398,761 B2
(45) Date of Patent: Mar. 19, 2013

(54) INK COMPOSITION, INK SET AND IMAGE RECORDING METHOD

(75) Inventor: Yukoh Saitoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 12/717,961

(22) Filed: Mar. 5, 2010

(65) Prior Publication Data

US 2010/0247768 A1     Sep. 30, 2010

(30) Foreign Application Priority Data

Mar. 24, 2009   (JP) ................. 2009-072432

(51) Int. Cl.
*C09D 11/02*     (2006.01)

(52) U.S. Cl. ................. 106/31.58; 106/31.27

(58) Field of Classification Search ............... 106/31.27
See application file for complete search history.

(56) References Cited

U.S. PATENT DOCUMENTS

| | | | | |
|---|---|---|---|---|
| 4,239,543 | A * | 12/1980 | Beasley ................ | 106/31.43 |
| 6,231,653 | B1 * | 5/2001 | Lavery et al. .......... | 106/31.36 |
| 6,280,512 | B1 * | 8/2001 | Botros .................. | 106/31.43 |
| 6,602,334 | B1 * | 8/2003 | Kaufmann ............. | 106/31.58 |
| 6,783,580 | B2 * | 8/2004 | Tyvoll et al. .......... | 106/31.47 |
| 7,052,534 | B2 * | 5/2006 | Taguchi ................ | 106/31.27 |
| 7,368,007 | B2 * | 5/2008 | Kusakata et al. ...... | 106/31.27 |
| 7,682,433 | B2 * | 3/2010 | Yanagimachi et al. .... | 106/31.6 |
| 2008/0193725 | A1 * | 8/2008 | De Saint-Romain ...... | 428/195.1 |

FOREIGN PATENT DOCUMENTS

JP     2003-285539 A     10/2003

* cited by examiner

*Primary Examiner* — Kaj K Olsen
*Assistant Examiner* — Veronica F Faison
(74) *Attorney, Agent, or Firm* — SOLARIS Intellectual Property Group, PLLC

(57) ABSTRACT

The present invention provides an ink composition for use in inkjet recording, the ink composition including one of water-soluble dye and water in an amount of from 20% to 40% by mass, which is capable of recording an image that is suppressed in the variation of image density immediately after printing.

10 Claims, No Drawings

INK COMPOSITION, INK SET AND IMAGE RECORDING METHOD

CROSS-REFERENCE TO RELATED APPLICATION

This application claims priority under 35 USC 119 from Japanese Patent Application No. 2009-072432 filed on Mar. 24, 2009, the disclosure of which is incorporated by reference herein.

BACKGROUND OF THE INVENTION

1. Field of the Invention

The present invention relates to an ink composition, an ink set and an image recording method.

2. Description of the Related Art

As an image recording method for recording a color image, various methods have been proposed in recent years. For example, as an inkjet recording method, a method of using an inkjet recording medium having an ink receiving recording layer that is configured in a porous structure has been put into practice. One example thereof is an inkjet recording medium having a recording layer that is formed on a support, contains inorganic pigment particles and a water-soluble binder, and has a high porosity. Owing to the porous structure that the recording medium possesses, the recording medium has such advantages as being excellent in rapid ink drying performance and having high gloss, whereby a photo quality image is able to be recorded.

As an ink that is used for an inkjet recording method, a variety of water-based inks that contain water-soluble dyes are proposed. In an inkjet recording method using water-based inks, not only images with high quality and high gloss which can be recorded at a higher speed are required to be stable, but also the density and hue of resulting recorded images are required to be stable.

As art related to the above, an inkjet recording ink is known which is characterized in that a water-soluble organic solvent is contained therein in an amount of from 5% by mass to 50% by mass, and that 80% by mass or more in the water-soluble organic solvent has a flash point of from 120° C. to 160° C. The related art describes an image that has variations in image density and color between immediately after printing and after aging reduced (for example, see Japanese Patent Application Laid-Open (JP-A) No. 2003-285539).

SUMMARY OF THE INVENTION

However, the ink described in JP-A No. 2003-285539 retains a large amount of volatile components immediately after printing, so that it is hard to say that the image density variation immediately after printing is sufficiently suppressed.

The present invention aims at providing an ink composition capable of recording an image that is suppressed in the variation of image density immediately after printing, an ink set that includes the ink composition, and an image recording method using the ink composition. More specifically, according to an aspect of the invention, an inkjet recording ink composition including: a water-soluble dye; and water in an amount of from 20% by mass to 40% by mass with respect to a total mass of the ink composition; an ink set including two or more ink compositions; and an image recording method using the ink set are provided.

DETAILED DESCRIPTION OF THE INVENTION

The objects to solve the problems may be achieved by items <1> to <14> shown below.

<1> An inkjet recording ink composition including: a water-soluble dye; and water in an amount of from 20% by mass to 40% by mass with respect to a total mass of the ink composition.

<2> The ink composition according to the item <1>, wherein the difference between a refractive index of the ink composition after drying when a volatile component of the ink composition has been removed and a refractive index of the ink composition before drying when the volatile component has not been removed is 0.05 or less.

<3> The ink composition according to the item <2>, wherein the refractive index of the ink composition before drying is in a range from 1.39 to 1.45.

<4> The ink composition according to any one of the items <1> to <3>, further comprising a water-soluble organic solvent.

<5> The ink composition according to the item <4>, wherein the water-soluble organic solvent includes a volatile water-soluble organic solvent having a refractive index in a range from 1.36 to 1.54.

<6> The ink composition according to the item <4> or the item <5>, wherein the water-soluble organic solvent includes a nonvolatile water-soluble organic solvent having a refractive index in a range from 1.38 to 1.48.

<7> The ink composition according to any one of the items <1> to <6>, further including an aliphatic monohydric alcohol having 1 to 4 carbon atoms in an amount of from 10% by mass to 60% by mass with respect to a total mass of the ink composition.

<8> The ink composition according to any one of the items <4> to <7>, wherein a content of the water-soluble organic solvent is in a range of from 10% by mass to 60% by mass.

<9> The ink composition according to any one of the items <1> to <8>, wherein the water-soluble dye is a water-soluble magenta dye.

<10> The ink composition according to any one of the items <1> to <8>, wherein the water-soluble dye is a water-soluble cyan dye.

<11> An ink set comprising two or more ink compositions according to any one of the items <1> to <10>.

<12> An ink set comprising the ink compositions according to the item <9> and the ink compositions according to the item <10>.

<13> The ink set according to the item <11> consisting of two or more of the ink compositions according to any one of the items <1> to <10>.

<14>. An image recording method, including recording an image by applying the ink composition according to any one of the items <1> to <10> or an ink composition being included in an ink set according to any one of the items <11> to <13> onto a recording medium using an inkjet system, the recording medium, including a support and an ink receiving layer which is disposed on the support and includes porous particles, an absolute value of difference between a refractive index of the porous particles, and a refractive index of the ink composition before drying, being 0.05 or less.

Ink Composition

An ink composition (hereinafter, simply referred to as "ink" in some cases) of the present invention includes at least one kind of water-soluble dye and water, and the content of the water is from 20% by mass to 40% by mass with respect to the total mass of the ink composition.

Owing to this composition, an image having an image density that is suppressed from varying immediately after printing is able to be recorded. Here, varying of the image density immediately after printing denotes that an apparent image density of a recorded image varies when at least a part of a volatile component vaporizes from the ink composition that is applied to a recording medium, namely, denoting that a difference is developed between a print density at the time immediately after the ink composition is applied to the recording medium (immediately after printing) and before the volatile component in the ink composition is removed (before drying); and a print density at the time after the ink composition is applied to the recording medium and after at least a part of the volatile component in the ink composition is removed (after drying).

This print density variation (or difference between the print densities) develops under a normal environment (for example, 23° C., 80% RH), but in a high humidity environment, the variation tends to become still larger. The ink composition of the present invention allows the print density variation to be suppressed effectively not only in a normal environment but also in a high humidity environment.

The ink composition formulated as described above has been accomplished based on the following findings of the present inventors. Namely, when the difference in the refractive indexes between inorganic fine particles that are included in an ink receiving layer formed on a recording medium and the ink composition is large, light scattering becomes large in the ink receiving layer due to this difference in the refractive indexes immediately after the ink composition is applied. On the other hand, when water that has a small refractive index (1.33 of refractive index) and is included in the ink composition vaporizes with time, the refractive index of a composition that is composed of a residue derived from the ink composition remained in the ink receiving layer increases, whereby the difference of the refractive index with respect to the refractive index (for example, 1.45 for silica, about 1.6 for alumina) of porous particles (inorganic fine particles) incorporated in the ink receiving layer becomes small, and the apparent density increases with time. Therefore, when an ink composition is used, which has a small (preferably 0.05 or less) difference between the refractive index at the time immediately after the ink composition is applied to the recording medium and the refractive index at the time after drying when at least a part of the volatile component included in the ink composition is removed, the print density variation immediately after printing is considered to be suppressed. Namely, for example, when an ink composition is formulated in a manner that the content of water that has a small refractive index is reduced, the difference in the refractive indexes between before drying and after drying is able to be suppressed small, whereby the print density variation immediately after printing is considered to be suppressed.

In the present invention, the difference between the refractive index after drying when at least a part of the volatile component included in the ink composition is removed and the refractive index before the volatile component is removed (namely, before drying) is preferably 0.05 or less and more preferably 0.03 or less. When the difference in the refractive indexes of the ink composition between before and after drying is 0.05 or less, the image density variation immediately after printing is able to be effectively suppressed.

In the present invention, the refractive index of the ink composition denotes a value that is measured by the total reflection method using a light source of sodium D line (589.3 nm of wavelength) at 20° C. The refractive index of the ink composition is measured with a refractometer of "Rx-5000α" (trade name, manufactured by ATAGO CO., LTD.).

In the present invention, "ink composition before drying" means an ink composition just before it is ejected out of an inkjet head. On the other hand, "ink composition after drying" means a composition that is composed of a residue derived from an ink composition obtained after an ink composition as-prepared is left under vacuum (10 Pa to 20 Pa) at 25° C. for 16 hours to remove volatile components.

The refractive index of the ink composition (before drying) of the present invention is not particularly limited, however, from the viewpoint of image density, the refractive index is preferably from 1.39 to 1.45 and more preferably from 1.41 to 1.45.

Further, the ink composition of the present invention, from the viewpoints of image density and suppression of the image density variation immediately after recording, preferably has a refractive index of from 1.39 to 1.45 before drying and a difference in refractive indexes between before and after drying of 0.05 or less and more preferably has a refractive index of from 1.41 to 1.45 before drying and a difference in refractive indexes between before and after drying of 0.03 or less.

The ink composition of the present invention has a water content of from 20% to 40% by mass, preferably from 30% to 40% by mass, and more preferably from 35% to 40% by mass.

When the water content is less than 20% by mass, possibly water-soluble dyes are deposited, ink ejection stability is lowered, and ink absorptivity to a recording medium is lowered. On the other hand, the water content is higher than 40% by mass, possibly the difference in refractive indexes of the ink composition between before and after drying becomes large, whereby the print density variation becomes large.

The ink composition of the present invention preferably further includes at last one kind of water-soluble organic solvent. The water-soluble organic solvent denotes an organic solvent that is capable of dissolving in an amount of 10 g or more in 100 g of water at 20° C.

As the water-soluble organic solvent, conventionally used organic solvents are usable without any particular restriction. Examples of water-soluble organic solvents include alcohols such as methanol, ethanol, propanol, isopropanol, butanol, isobutanol, sec-butanol, t-butanol, pentanol, hexanol, cyclohexanol and benzylalcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine; and other polar solvents such as formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. The water-soluble organic solvent may be used in a combination of them.

The ink composition of the present invention preferably includes, as a volatile component, at least one kind of water-soluble organic solvent (hereinafter, referred to as "first water-soluble organic solvent" in some cases) that has a larger refractive index than water. The refractive index of the first water-soluble organic solvent is preferably from 1.36 to 1.54 and more preferably from 1.38 to 1.40.

Examples of the water-soluble organic solvent that has a larger refractive index than water includes: an aliphatic ketone such as acetone, methylisobutylketone, or methylethylketone; and an aliphatic monohydric alcohol such as methanol, ethanol, 1-propanol, 2-propanol, n-butanol, s-butanol, or t-butanol. Among these, from the viewpoints of safety of inks and effect to the environment in which the solvent is used, an aliphatic monohydric alcohol is preferable and an aliphatic monohydric alcohol having from 1 to 4 carbon atoms is more preferable.

The first water-soluble organic solvent may include one kind singly or two or more kinds thereof.

The content of the first water-soluble organic solvent in the ink composition is preferably from 10% by mass to 60% by mass and more preferably from 20% by mass to 60% by mass with respect to a total mass of the ink composition. When the content is 60% by mass or less, solubility of water-soluble dyes and ink ejection property become adequate. When the content is 10% by mass or more, change in the refractive index caused by drying of the ink composition is suppressed and the image density variation immediately after printing is more effectively suppressed.

In addition, the content of the first water-soluble organic solvent in the ink composition is, from the viewpoint of suppressing the print density variation in a high humidity environment, preferably 15% by mass or less and more preferably 10% by mass or less.

Further in the ink composition of the present invention, from the viewpoint of suppressing the image density variation immediately after printing, an aliphatic monohydric alcohol having from 1 to 4 carbon atoms is preferably included in an amount of from 10% by mass to 60% by mass, and more preferably an aliphatic monohydric alcohol selected from 1-propanol, 2-propanol, n-butanol, s-butanol, and t-butanol is included in an amount of from 20% by mass to 60% by mass.

In addition, the ink composition of the present invention also includes, as a nonvolatile component, preferably at least one kind of water-soluble organic solvent (hereinafter, referred to as "second water-soluble organic solvent" in some cases) that has a refractive index close to water. Whereby, the change in the refractive index of the ink composition between before drying and after drying is made to be smaller and the image density variation immediately after printing is able to be suppressed more effectively.

The refractive index of the second water-soluble organic solvent is preferably from 1.38 to 1.48 and more preferably from 1.38 to 1.42. Note that, the second water-soluble organic solvent is nonvolatile. Herein, "nonvolatile" denotes that the solvent does not substantially vaporize after printed on a recording medium and that the vapor pressure thereof at 20° C. is specifically less than 10 mmHg.

Examples of the second water-soluble organic solvents include glycerin or derivatives thereof; glycols such as ethylene glycol, propylene glycol, diethylene glycol, dipropylene glycol, triethylene glycol and tripropylene glycol; ethylene glycol alkyl ethers; diethylene glycol alkyl ethers; and propylene glycol alkyl ethers. Among them, at least one selected from the group consisting of ethylene glycol monoethyl ether, ethylene glycol diethyl ether, diethylene glycol ethyl methyl ether, propylene glycol dimethyl ether and propylene glycol diethyl ether may be preferably used as the second water-soluble organic solvent.

These water-soluble organic solvents, because the refractive index thereof is in the range of from 1.38 and 1.42, suppress more effectively the change in the refractive indexes of the ink composition between before drying and after drying.

The content of the second water-soluble organic solvent in the present invention is, from the viewpoint of suppressing the image density variation immediately after printing, preferably from 10% by mass to 70% by mass and more preferably from 40% by mass to 70% by mass.

Further, from the viewpoint of suppressing the image density variation in a high humidity environment, the second water-soluble organic solvent selected from an alkyl ether such as ethylene glycol, another alkyl ether such as diethylene glycol, and still another alkyl ether such as propylene glycol is preferably included in an amount of from 20% by mass to 60% by mass, and more preferably at least one kind selected from ethylene glycol monoethyl ether, ethylene glycol diethyl ether, diethylene glycol dimethyl ether, diethylene glycol ethyl methyl ether, propylene glycol dimethyl ether, and propylene glycol diethyl ether is included in an amount of from 25% by mass to 50% by mass.

In the ink composition of the present invention, from the viewpoint of suppressing the image density variation immediately after printing, water in an amount of from 20% to 40% by mass and the first water-soluble organic solvent in an amount of from 10% to 60% by mass are preferably included, and more preferably water in an amount of from 35% to 40% by mass and an aliphatic monohydric alcohol having from 1 to 4 carbon atoms in an amount of from 10% to 60% by mass are included.

In addition, preferably water in an amount of from 20% to 40% by mass and the second water-soluble organic solvent in an amount of from 50% to 70% by mass are included. More preferably, water in an amount of from 20% to 40% by mass and at least one kind selected from ethylene glycol monoethyl ether, ethylene glycol diethyl ether, diethylene glycol dimethyl ether, diethylene glycol ethyl methyl ether, propylene glycol dimethyl ether, and propylene glycol diethyl ether in an amount of from 20% by mass to 45% by mass are included.

Water-Soluble Dye

The ink composition of the present invention includes at least one kind of water-soluble dye. Herein, the water-soluble dye denotes a dye that is capable of dissolving in an amount of 5 g or more in 100 g of water at 20° C.

As the water-soluble dye in the present invention, known water-soluble dyes are usable without any particular restriction. Water-soluble dyes having a desired color such as magenta, cyan, yellow, or black are selected and usable appropriately.

Magenta Dye

Examples of a magenta dye usable in the present invention include: an aryl or heteryl azo dye that has phenols, naphthols, anilines or the like as a coupler ingredient; an azomethine dye that has pyrazolones, pyrazolotriazoles or the like as a coupler ingredient; a methine dye such as an arylidene dye, a styryl dye, a merocyanine dye, a cyanine dye, or an oxonol dye; a carbonium dye such as a diphenylmethane dye, a triphenylmethane dye, or a xanthene dye; a quinone dye such as naphthoquinone, anthraquinone, or anthrapyrrolidone; and a condensed polycyclic dye such as a dioxazine dye, but the invention is not limited to these examples.

Specifically, for example, a magenta dye or the like that is described in the paragraph numbers of from [0570] to [0578] in JP-A No. 2007-138124 is included.

Further, as the magenta dye in the present invention, from the view points of ozone resistance and color developing properties, a magenta dye represented by the following Formula (M) is preferable.

Formula (M):

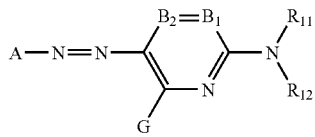

In Formula (M), A represents a residue of a 5-membered heterocyclic diazo component A-NH$_2$; each of $B_1$ and $B_2$ independently represents —$CR_{13}$= or —$CR_{14}$=, or either one represents a nitrogen atom and the other represents —$CR_{13}$= or —$CR_{14}$=; each of $R_{11}$ and $R_{12}$ independently represents a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, of which each group may further have a substituent; each of G, $R_{13}$ and $R_{14}$ independently represents a hydrogen atom, a halogen atom, an alkyl group, an alkenyl group, an alkynyl group, an aralkyl group, an aryl group, a heterocyclic group, a cyano group, a carboxy group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group or an aryl group or a heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group, of which each group may further have a substituent; and $R_{13}$ and $R_{11}$, or $R_{11}$ and $R_{12}$ may be bonded to each other form a 5- or 6-membered ring, provided that the dye represented by Formula (M) has at least one ionic hydrophilic group (preferably a sulfonic acid group).

Exemplary embodiments and specific examples of the magenta dye represented by Formula (M) include the ones described in the paragraph numbers of from [0489] to [0596] of JP-A No. 2007-138124.

Cyan Dye

Examples of a cyan dye include: an aryl or heterocyclic azo dye that has phenols, naphthols, anilines or the like as a coupler ingredient; an azomethine dye that has heterocycles such as phenols, naphthols, or pyrrolotriazole as a coupler ingredient; a polymethine dye such as a cyanine dye, an oxonol dye, or a melocyanine dye; a carbonium dye such as a diphenylmethane dye, a triphenylmethane dye, or a xanthene dye; a phthalocyanine dye; an anthraquinone dye; and an indigo or thioindigo dye, but the invention is not limited to these examples.

Specifically, for example, the cyan dyes and the like described in the paragraph numbers of from [0660] to [0664] of JP-A No. 2007-138124 are included.

Furthermore, as the cyan dye in the present invention, from the viewpoints of ozone resistance and color developing properties, a cyan dye represented by the following Formula (C) is preferable.

Formula (C):

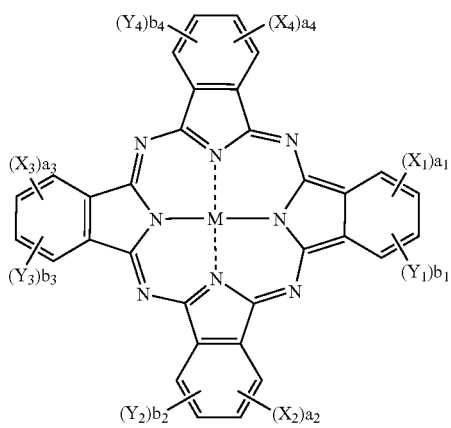

In Formula (C), each of $X_1$, $X_2$, $X_3$ and $X_4$ independently represents any of —SO—Z, —SO$_2$—Z, —SO$_2$NV$_1$V$_2$, —CONV$_1$V$_2$, —CO$_2$Z, —CO—Z, or a sulfo group; Z independently represents an alkyl group, a cycloalkyl group, an alkenyl group, an alkynyl group, an aralkyl group, an aryl group, or a heterocyclic group; $V_1$ and $V_2$, which may be the same or different, each represent a hydrogen atom, an alkyl group, a cycloalkyl group, an alkenyl group, an alkynyl group, an aralkyl group, an aryl group, or a heterocyclic group.

Each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, of which each group may further have a substituent.

$a_1$ to $a_4$ and $b_1$ to $b_4$ respectively represent numbers of substituents of $X_1$ to $X_4$ and $Y_1$ to $Y_4$, each of $a_1$ to $a_4$ independently representing an integer of from 0 to 4, provided that all of $a_1$ to $a_4$ do not represent 0 at the same time, and each of $b_1$ to $b_4$ independently representing an integer of from 0 to 4; M represents a hydrogen atom, a metal atom or an oxide thereof, a hydroxide thereof, or a halide thereof; and at least one of $X_1$, $X_2$, $X_3$, $X_4$, $Y_1$, $Y_2$, $Y_3$ or $Y_4$ represents an ionic hydrophilic group, or a group having an ionic hydrophilic group as a substituent.

Exemplary embodiments and specific examples of the cyan dye represented by Formula (C) include the ones described in the paragraph numbers of from [0581] to [0663] of JP-A No. 2007-138124.

Yellow Dye

Examples of a yellow dye include: an aryl or heterocyclic azo dye that has phenols, anilines, pyrazolones, pyridones, open-chain active methylene compounds or the like as a coupler ingredient; an azomethine dye that has open-chain active methylene compounds as a coupler ingredient; a methine dye such as a benzylidene dye or a monomethine oxonol dye; a quinone dye such as a naphthoquinone dye or an anthraquinone dye; a quinophthalone dye; a nitro or nitroso dye; an acrydine dye; and an acrydinone dye.

Specifically, the yellow dyes and the like described in the paragraph numbers of from to [0481] in JP-A No. 2007-138124 are included.

Furthermore, as the yellow dye in the present invention, from the ozone resistance and color developing properties, a yellow dye represented by the following Formula (Y) is preferable.

Formula (Y):

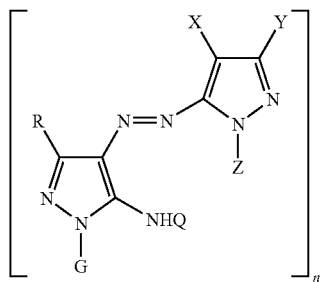

In Formula (Y), G represents a heterocyclic group. R, X, Y, Z and Q each independently represent a substituent. n represents an integer of 1 to 3. In a case where n is 1, R, X, Y, Z, Q and G each independently represent a monovalent substituent. In a case where n is 2, R, X, Y, Z, Q and G each independently represent a monovalent substituent or a divalent substituent, provided that at least one of R, X, Y, Z, Q and G represents a divalent substituent. In a case where n is 3, R, X, Y, Z, Q and G each independently represent a monovalent substituent, a divalent substituent or a trivalent substituent, provided that at least two of R, X, Y, Z, Q and G represent a divalent substituent or at least one of R, X, Y, Z, Q and G represents a trivalent substituent.

When n is 2 or 3, the azo dye represented by Formula (Y) has a structure in which one partial structure is linked to another partial structure(s) via the divalent or trivalent group(s) represented by R, X, Y, Z, Q and G, in which the partial structure has the structure shown in the parenthis in Formula (Y) except for the divalent or trivalent group(s).

Exemplary embodiments and specific examples of the yellow dye represented by Formula (Y) include the ones described in the paragraph numbers of from [0149] to [0472] in JP-A No. 2007-138124.

Black Dye

Examples of a black dye in the present invention include: disazo, trisazo, and tetra-azo dyes. Besides the black dye, a carbon black dispersion may be used. Preferred examples include the ones described in JP-A No. 2005-307177.

Further, as the black dye in the present invention, from the viewpoints of ozone resistance and color developing properties, a black dye represented by the following Formula (B) is preferable.

Formula (B):

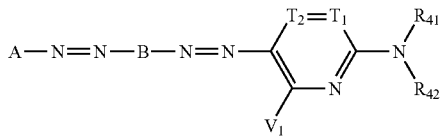

In Formula (B), A represents a monovalent aromatic group which may have substituent(s) or a monovalent heterocyclic group which may have substituent(s), and B represents a divalent aromatic group which may have substituent(s) or a divalent heterocyclic group which may have substituent(s); $T_1$ and $T_2$ each independently represent $=CR_{43}-$ or $-CR_{44}=$, or either one of them represents a nitrogen atom and the other one represents $=CR_{43}-$ or $-CR_{44}=$; $V_1$, $R_{43}$, and $R_{44}$ each independently represent a hydrogen atom, a halogen atom, an alkyl group, an alkenyl group, an alkynyl group, an aralkyl group, an aryl group, a heterocyclic group, a cyano group, a carboxy group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, of which each group may be further substituted; $R_{41}$ and $R_{42}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, arylsulfonyl group, or a sulfamoyl group, of which each group may further have a substituent; $R_{41}$ and $R_{42}$ are not simultaneously hydrogen atoms; and $R_{43}$ and $R_{41}$ or $R_{41}$ and $R_{42}$ may be bonded to each other to form a 5- to 6-membered ring.

Furthermore, as the black dye, at least one kind selected from the compounds represented by Formula (B) and the salts thereof and at least one kind selected from compounds represented by the following Formula (B11) and the salts thereof are preferably included.

$$G_1-N=N-G_2-L-K \quad \text{Formula (B11)}$$

In Formula (B11), $G_1$ and $G_2$, each independently represent an aryl group that may be substituted or a heterocyclic group that may be substituted; and K is an arbitrary substitution group. L is a bivalent linkage group. Note that, Formula (B11) has at least one ionic hydrophilic group.

Exemplary embodiments and specific examples of the black dye represented by Formula (B) include the ones described in the paragraph numbers of from [0699] to [0772] of JP-A No. 2007-138124. Further, exemplary embodiments and specific examples of the compounds represented by Formula (B11) include the ones described in the paragraph numbers of from [0775] to [0795] of JP-A No. 2007-138124.

In the ink composition of the present invention, the content of the water-soluble dye may be appropriately selected in accordance with the dye. For example, the content may be from 1% by mass to 10% by mass, preferably from 2% by mass to 8% by mass, and more preferably from 5% by mass to 8% by mass.

The ink composition of the present invention is formulated by including the water-soluble dye and optionally a water-soluble organic solvent, but preferably further including at least one kind of betaine compound. Herein, the betaine compound denotes a compound that has both cationic moiety and anionic moiety in the molecule thereof and is preferably a betaine type surfactant that has an oil-soluble group.

Examples of the cationic moiety include: a nitrogen atom of amines, a nitrogen atom of hetero aromatic rings, a boron atom that has four bonds each connected with a carbon atom, and a phosphorus atom that has four bonds each connected with a carbon atom. Among these, a nitrogen atom of amine or a nitrogen atom of a hetero aromatic ring is preferable, and particularly a quaternary nitrogen atom is preferable.

Examples of the anionic moiety include: a hydroxy group, a thio group, a sulfone amido group, a sulfo group, a carboxy group, an imido group, a phosphoric acid group, and a phosphonic acid group. Among them, a carboxy group and a sulfo group are particularly preferable. The charge of the whole molecule of a betaine compound may be any of cationic, anionic, and neutral, but is preferably neutral.

Specific examples of the betaine compound used preferably in the present invention include the compounds described in the paragraph numbers of from [0802] to [0833] of JP-A No. 2007-138124, and the exemplary embodiments thereof are also the same.

The content of the betaine compound in the ink composition is preferably from 1% by mass to 5% by mass and more preferably from 1% by mass to 2% by mass.

The ink composition of the present invention is prepared by dissolving the water-soluble dye in a water-based medium. Optionally, the other additives may be included as long as the effect of the present invention is not impaired. Examples of the other additives include known additives such as an anti-dry agent (moistening agent), an anti-fading agent, an emulsion stabilizer, a penetration promoter, a UV light absorber, an antiseptic agent, an anti-mold agent, a pH adjusting agent, a surface tension conditioner, a defoaming agent, a viscosity conditioner, a dispersant, a dispersion stabilizer, an anti-corrosion agent, or a chelating agent. These various kinds of additives are added directly to the ink liquid.

Specific examples of the other additives include the compounds described in the paragraph numbers of from [0842] to [0852] of JP-A No. 2007-138124.

The ink composition of the present invention is prepared by incorporating the components that are appropriately selected from the above described components, but the viscosity of the resulting ink composition is preferably less than 10 mPa·s at 20° C. Further, in the present invention, the surface tension of the ink composition is adjusted at preferably 45 mN/m or less at 20° C., and particularly preferably in the range of from 25 mN/m to 45 mN/m. By adjusting the viscosity and surface tension in this way, an ink composition that has desirable performances for use in the inkjet recording method is attainable. The viscosity and surface tension may be adjusted by appropriately regulating and selecting the amount of the solvent and various kinds of additives that are incorporated in the ink composition, the kind thereof, and the others.

The ink composition of the present invention, the pH thereof is preferably from 7.0 to 10.5 at 20° C. and more preferably from 7.5 to 10.0. When the pH of the ink composition at 20° C. is adjusted at 7.0 or higher, the co-deposited plating of an inkjet head is prevented from being peeled off, thereby stabilizing the ejection performance of the ink composition from the inkjet head. When the pH of the ink composition at 20° C. is adjusted at 10.5 or lower, various members that are in contact with the ink composition, for example, the members that compose an ink cartridge or an inkjet head are prevented from being degraded.

The ink composition of the present invention is prepared as, for example: the components to be incorporated in the ink composition are sufficiently mixed together and uniformly dissolved; and then the resulting mixture is subjected to pressure filtration with a membrane filter so as to remove crude particles. Further, optionally the resulting ink composition may be deaerated with a vacuum pump.

Ink Set

The ink set of the present invention is composed of two or more kinds of the ink compositions. By incorporating the ink compositions, image density variation immediately after printing is suppressed when an image is formed by using the ink set. Whereby, an image having an excellent color balance is able to be formed.

Further, the ink set of the invention may be used in the form of an ink cartridge in which the respective inks are accommodated integrally or in the form of a set of ink cartridges in which the respective inks are accommodated independently; the ink cartridge or the set of ink cartridges is preferable from the viewpoint of ease of handling. An ink cartridge containing an ink set or a set of ink cartridges containing an ink set is known in the art, and can be produced by appropriately using known methods.

The ink set of the present invention is composed of, among the ink compositions, preferably at least one kind of magenta ink that contains a magenta dye and at least one kind of cyan ink that contains a cyan dye.

The magenta and cyan inks have such a tendency that the print density variation caused by the refractive index change immediately after printing becomes large. Therefore, an ink set constituted of the magenta and cyan inks that are composed of the ink compositions of the present invention suppresses more effectively the image density variation immediately after printing, whereby, an image having an excellent color balance is able to be formed.

Further, the ink set of the present invention is preferably constituted of only the ink compositions of the present invention. This constitution allows the image density variation immediately after printing to be suppressed more effectively, allowing an image having an excellent color balance to be formed.

Image Recording Method

The image recording method of the present invention includes a step in which the ink composition or an ink composition that is incorporated in the ink set is applied onto a recording medium by using the inkjet method. The recording medium has a support and an ink receiving layer that is disposed on the support and includes porous particles having an absolute value of difference between a refractive index of the porous particles and the refractive index of the ink composition before drying being 0.05 or less. The method may include optionally the other steps such as a drying step.

When the absolute value of the refractive index difference between the ink composition and the porous particles is less than 0.05, light scattering caused by the refractive index difference is suppressed, whereby an image is able to be recorded at a high print density and the print density variation immediately after printing is also suppressed.

The ink composition and ink set that are used in the present invention are as described above.

The recording medium has not any particular restriction as long as it has a support and an ink receiving layer formed on the support and the absolute value of the refractive index difference between the porous particles incorporated in the ink receiving layer and the ink composition is 0.05 or less. Specifically, for example, the recording materials described in JP-A Nos. 8-169172, 8-27693, 2-276670, 7-276789, 9-323475, 62-238783, 10-153989, 10-217473, 10-235995, 10-337947, 10-217597, and 2008-246988 are usable.

The porous particles are not particularly limited as long as they allow the absolute value of the refractive index difference with respect to the ink composition to be 0.05 or less. Inorganic fine particles that are conventionally used for inkjet recording media are also usable as the recording medium of the present invention. Specifically, for example, the inorganic fine particles described in the paragraph numbers of from [0033] to [0042] of JP-A No. 2008-246988 are usable. Silica fine particles, alumina, and hydrated alumina are preferable.

Examples of the support include the support described in the paragraph numbers of from [0139] to [0155] of JP-A No. 2008-246988, and the exemplary embodiments thereof are also the same.

As for the inkjet method for recording an image onto a recording media, one of known methods may be applied without particular restriction. For example, a charge control method where an ink is discharged by making use of electrostatic attraction, a drop-on demand method that makes use of vibration pressure of a piezo device (pressure-pulse method), an acoustic inkjet method where a electric signal is, after converting into an acoustic beam, illuminated on an ink to discharge an ink by making use of radiation pressure, and a thermal inkjet method where an ink is heated to generate foams and generated pressure is made use of may be used. Furthermore, the inkjet recording method includes a method where an ink that is called a photo-ink and low in the concentration is discharged a lot with a small volume, a method where a plurality of inks that have substantially same hue and are different in concentration is used to improve an image quality, and a method where a transparent and colorless ink is used.

EXAMPLES

The invention will be described more specifically with reference to examples, but the scope of the invention is by no means restricted to the following specific examples. In the examples "parts" and "%" are based on mass unless otherwise indicated.

Example 1

[Preparation of Ink Compositions M1-1 to M1-6]

Ink compositions M1-1 to M1-6 were prepared respectively by mixing each component together for 1 hour in a manner that the following formulations shown in Table 1 were attained; and filtering the resulting liquid with a membrane filter having a pore diameter of 0.22 μm.

The value for each component shown in Table 1 shows the mass % of each component when the total mass of the ink composition was 100%. DE represents diethylene glycol. DEGdME represents diethylene glycol dimethyl ether. PG represents propylene glycol. "OLFINE E1010" (trade name) was a surfactant manufactured by Nissin Chemical Industry Co., Ltd. "PROXEL XL II" (trade name) was an antiseptic agent manufactured by Air Products and Chemicals Inc.

Comparative Example 1

[Preparation of Ink Compositions MH1-1 and MH1-2]

Ink compositions MH1-1 and MH1-2 serving as comparative example inks were prepared respectively in a manner substantially similar to that in Example 1, except that the formulations of the inks were changed into the formulations shown in Table 1.

Note that, when the content of pure water in the ink composition was less than 20%, dye powders were not fully dissolved and a uniform ink composition was not attainable.

TABLE 1

|  | Ink Composition M1-1 | Ink Composition M1-2 | Ink Composition M1-3 | Ink Composition M1-4 | Ink Composition M1-5 | Ink Composition M1-6 | Ink Composition MH1-1 | Ink Composition MH1-2 |
|---|---|---|---|---|---|---|---|---|
| Water-soluble Dye M1 | 6 | 6 | 6 | 6 | 6 | 6 | 6 | 6 |
| Glycerin | 8 | 8 | 2 | 8 | 38 | 48 | 8 | 3 |
| DEG | 9 | 7 | 1 | 4 | 1 | 1 | 4 | 1 |
| DEGdME | 41 | 30 | 5 | 18 | 3 | 3 | 18 | 6 |
| PG | 12 | 9 | 2 | 5 | 0 | 0 | 5 | 2 |
| 1-Propanol | 0 | 0 | 60 | 20 | 10 | 0 | 0 | 0 |
| Surfactant W | 2 | 2 | 2 | 2 | 2 | 2 | 2 | 2 |
| OLFINE E1010 | 1 | 1 | 1 | 1 | 1 | 1 | 1 | 1 |
| PROXEL XL II | 0.1 | 0.1 | 0.1 | 0.1 | 0.1 | 0.1 | 0.1 | 0.1 |
| Benzotriazole | 0.002 | 0.002 | 0.002 | 0.002 | 0.002 | 0.002 | 0.002 | 0.002 |
| Water | 20.9 | 36.9 | 20.9 | 35.9 | 38.9 | 38.9 | 55.9 | 78.9 |

Water-soluble Dye M1:

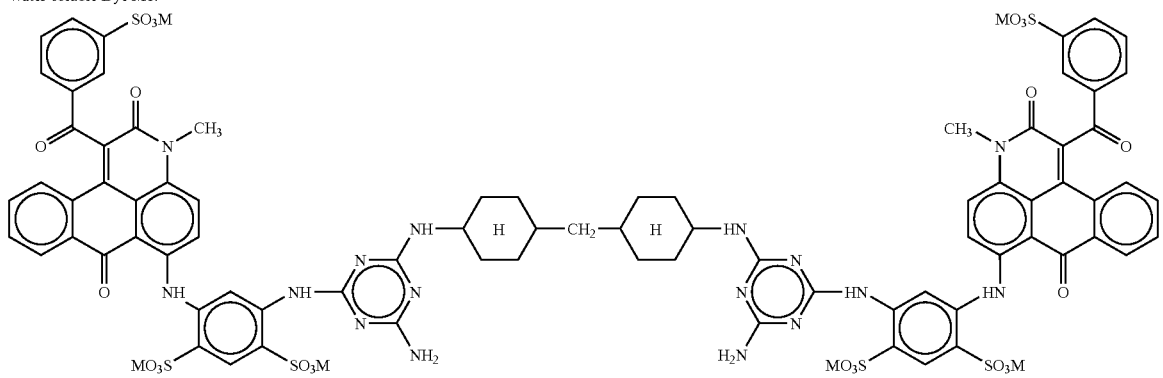

(M = $NH_4$ or Na)

TABLE 1-continued

| | Ink Composition M1-1 | Ink Composition M1-2 | Ink Composition M1-3 | Ink Composition M1-4 | Ink Composition M1-5 | Ink Composition M1-6 | Ink Composition MH1-1 | Ink Composition MH1-2 |
|---|---|---|---|---|---|---|---|---|

Surfactant W:

$$(n)C_{14}H_{29}-\overset{\overset{CH_3}{|}}{\underset{\underset{CH_3}{|}}{N^{\oplus}}}-CH_2-CO_2^{\ominus}$$

Example 2

[Preparation of Ink Compositions M2-1 to M2-6]

Ink compositions M2-1 to M2-6 were prepared respectively in a manner substantially similar to that in Example 1, except that the water-soluble dye M1 used in the formulation of the ink compositions M1-1 to M1-6 in Example 1 was replaced with the following water-soluble dye M2 in formulations of ink compositions M2-1 to M2-6, respectively.

Comparative Example 2

[Preparation of Ink Compositions MH2-1 and MH2-2]

Ink compositions MH2-1 and MH2-2 serving as comparative example inks were prepared respectively in a manner substantially similar to that in Comparative Example 1, except that the water-soluble dye M1 used in the formulation of the ink compositions MH1-1 and MH1-2 in Comparative Example 1 was replaced with the following water-soluble dye M2 in formulations of ink compositions MH2-1 and MH2-2, respectively.

Water-soluble Dye M2:

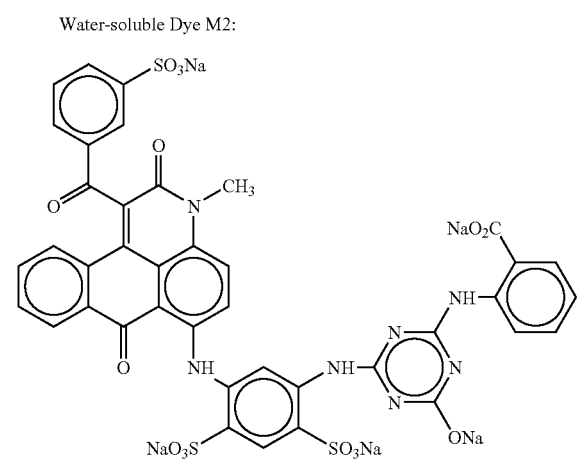

Example 3

[Preparation of Ink Compositions M3-1 to M3-6]

Ink compositions M3-1 to M3-6 were prepared respectively in a manner substantially similar to that in Example 1, except that the water-soluble dye M1 used in the formulation of the ink compositions M1-1 to M1-6 in Example 1 was replaced with the following water-soluble dye M3 in formulations of ink compositions M3-1 to M3-6, respectively.

Comparative Example 3

[Preparation of Ink Compositions MH3-1 and MH3-2]

Ink compositions MH3-1 and MH3-2 serving as comparative example inks were prepared respectively in a manner substantially similar to that in Comparative Example 1, except that the water-soluble dye M1 used in the formulation of the ink compositions MH1-1 and MH1-2 in Comparative Example 1 was replaced with the following water-soluble dye M3 in formulations of ink compositions MH3-1 and MH3-2, respectively.

Water-soluble Dye M3:

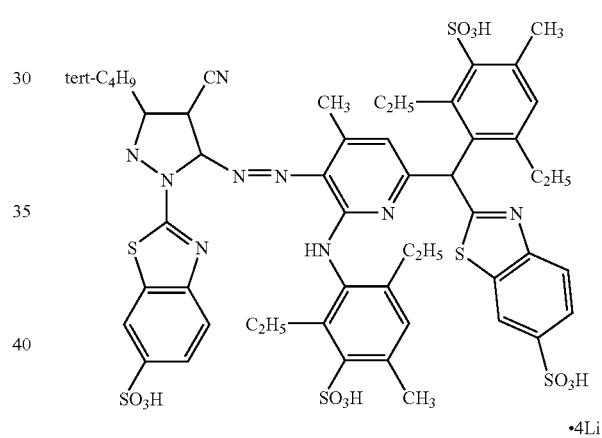

Example 4

[Preparation of Ink Compositions C1-1 to C1-6]

Ink compositions C1-1 to C1-6 were prepared respectively in a manner substantially similar to that in Example 1, except that the formulations shown in Table 1 in Example 1 was changed to a formulation shown in the following Table 2. As a water-soluble dye C1, Direct Blue-199 (manufactured by Nippon Chemical Co. Ltd.) was used.

Comparative Example 4

[Preparation of Ink Compositions CH1-1 and CH1-2]

Ink compositions CH1-1 and CH1-2 were prepared respectively in a manner substantially similar to that in Comparative Example 1, except that the formulations shown in Table 1 was changed to a formulation shown in the following Table 2. As a water-soluble dye C1, Direct Blue-199 (manufactured by Nippon Chemical Co. Ltd.) was used.

TABLE 2

| | Ink Composition C1-1 | Ink Composition C1-2 | Ink Composition C1-3 | Ink Composition C1-4 | Ink Composition C1-5 | Ink Composition C1-6 | Ink Composition CH1-1 | Ink Composition CH1-2 |
|---|---|---|---|---|---|---|---|---|
| Water-soluble Dye C1 | 6 | 6 | 6 | 6 | 6 | 6 | 6 | 6 |
| Glycerin | 10 | 10 | 3 | 10 | 40 | 50 | 10 | 3 |
| DEG | 11 | 8 | 1 | 5 | 1 | 1 | 5 | 1 |
| DEGdME | 40 | 29 | 6 | 18 | 3 | 3 | 18 | 6 |
| PG | 11 | 8 | 2 | 5 | 0 | 0 | 5 | 2 |
| 1-Propanol | 0 | 0 | 60 | 20 | 10 | 0 | 0 | 0 |
| OLFINE E1010 | 1 | 1 | 1 | 1 | 1 | 1 | 1 | 1 |
| PROXEL XL II | 0.1 | 0.1 | 0.1 | 0.1 | 0.1 | 0.1 | 0.1 | 0.1 |
| Benzotriazole | 0.002 | 0.002 | 0.002 | 0.002 | 0.002 | 0.002 | 0.002 | 0.002 |
| Water | 20.9 | 37.9 | 20.9 | 34.9 | 38.9 | 38.9 | 54.9 | 80.9 |

Example 5

[Preparation of Ink Compositions C2-1 to C2-6]

Ink compositions C2-1 to C2-6 were prepared respectively in a manner substantially similar to that in Example 4, except that the water-soluble dye C1 used in the formulation of the ink compositions C1-1 to C1-6 in Example 4 was replaced with the following water-soluble dye C2 in formulations of ink compositions C2-1 to C2-6, respectively.

Comparative Example 5

[Preparation of Ink Compositions CH2-1 and CH2-2]

Ink compositions CH2-1 and CH2-2 serving as comparative example inks were prepared respectively in a manner substantially similar to that in Comparative Example 4, except that the water-soluble dye C1 used in the formulation of the ink compositions CH1-1 and CH1-2 in Comparative Example 4 was replaced with the following water-soluble dye C2 in formulations of ink compositions CH2-1 and CH2-2, respectively.

Water-soluble Dye C2:

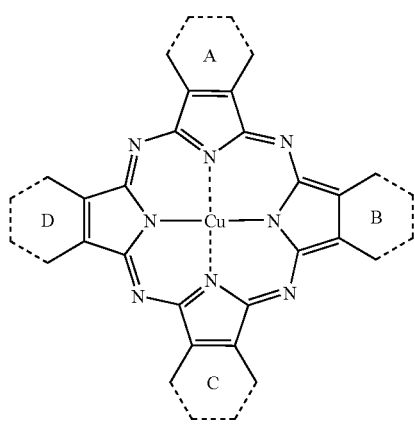

one of the rings A to D is

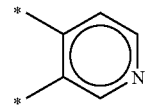

the other three rings are

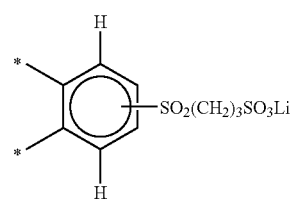

* represents the bonding positions on the phthalocyanine ring.

Example 6

[Preparation of Ink Compositions C3-1 to C3-6]

Ink compositions C3-1 to C3-6 were prepared respectively in a manner substantially similar to that in Example 4, except that the water-soluble dye C1 used in the formulation of the ink compositions C1-1 to C1-6 in Example 4 was replaced with the following water-soluble dye C3 in formulations of ink compositions C3-1 to C3-6, respectively.

Comparative Example 6

[Preparation of Ink Compositions CH3-1 and CH3-2]

Ink compositions CH3-1 and CH3-2 serving as comparative example inks were prepared respectively in a manner substantially similar to that in Comparative Example 4, except that the water-soluble dye C1 used in the formulation of the ink compositions CH1-1 and CH1-2 in Comparative Example 4 was replaced with the following water-soluble dye C3 in formulations of ink compositions CH3-1 and CH3-2, respectively.

Water-soluble Dye C3:

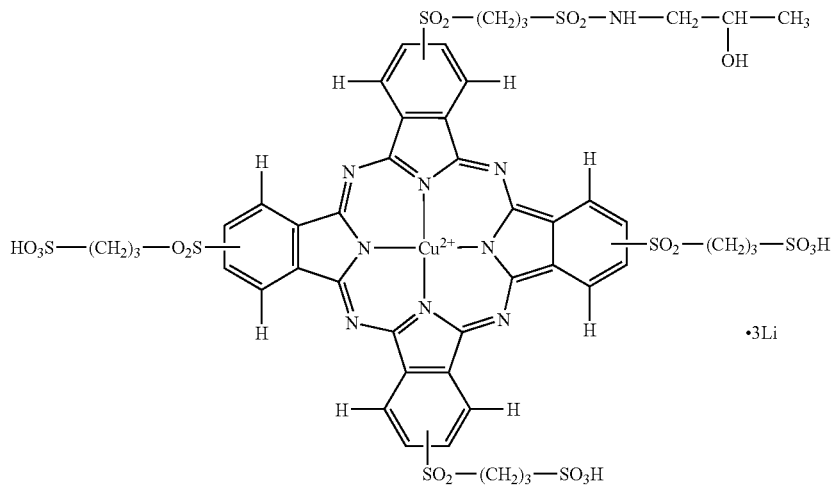

Example 7

[Preparation of Ink Compositions Y1-1 to Y1-6]

Ink compositions Y1-1 to Y1-6 were prepared respectively in a manner substantially similar to that in Example 1, except that the formulations shown in Table 1 in Example 1 was changed to a formulation shown in the following Table 3. As a water-soluble dye Y1, Direct Yellow-86 (manufactured by Nippon Chemical Co. Ltd.) was used.

Comparative Example 7

[Preparation of Ink Compositions YH1-1 and YH1-2]

Ink compositions YH1-1 and YH1-2 were prepared respectively in a manner substantially similar to that in Comparative Example 1, except that the formulations shown in Table 1 was changed to a formulation shown in the following Table 3. As a water-soluble dye Y1, Direct Tellow-86 (manufactured by Nippon Chemical Co. Ltd.) was used.

TABLE 3

|  | Ink Composition Y1-1 | Ink Composition Y1-2 | Ink Composition Y1-3 | Ink Composition Y1-4 | Ink Composition Y1-5 | Ink Composition Y1-6 | Ink Composition YH1-1 | Ink Composition YH1-2 |
|---|---|---|---|---|---|---|---|---|
| Water-soluble Dye Y1 | 6 | 6 | 6 | 6 | 6 | 6 | 6 | 6 |
| Glycerin | 8 | 8 | 3 | 8 | 39 | 49 | 8 | 3 |
| DEG | 9 | 7 | 1 | 4 | 1 | 1 | 4 | 1 |
| DEGdME | 41 | 30 | 6 | 18 | 3 | 3 | 18 | 6 |
| PG | 12 | 9 | 2 | 5 | 0 | 0 | 5 | 2 |
| 1-Propanol | 0 | 0 | 60 | 20 | 10 | 0 | 0 | 0 |
| OLFINE E1010 | 1 | 1 | 1 | 1 | 1 | 1 | 1 | 1 |
| PROXEL XL II | 0.1 | 0.1 | 0.1 | 0.1 | 0.1 | 0.1 | 0.1 | 0.1 |
| Benzotriazole | 0.002 | 0.002 | 0.002 | 0.002 | 0.002 | 0.002 | 0.002 | 0.002 |
| Water | 22.9 | 38.9 | 20.9 | 37.9 | 39.9 | 39.9 | 57.9 | 80.9 |

Example 8

Comparative Example 8

[Preparation of Ink Compositions Y2-1 to Y2-6, YH2-1, and YH2-2]

Ink compositions Y2-1 to Y2-6, YH2-1, and YH2-2 were prepared in a manner substantially similar to that in Example 7, except that Direct Yellow 132 (manufactured by Sandoz, Inc.) was respectively used as a water-soluble dye Y2 in place of the water-soluble dye Y1 in Example 7.

[Preparation of Ink Compositions Y3-1 to Y3-6, YH3-1, and YH3-2]

Ink compositions Y3-1 to Y3-6, YH3-1, and YH3-2 were prepared in a manner substantially similar to that in Example 7, except that the following water-soluble dye Y3 was respectively used in place of the water-soluble dye Y1 in Example 7.

Water-soluble Dye Y3:

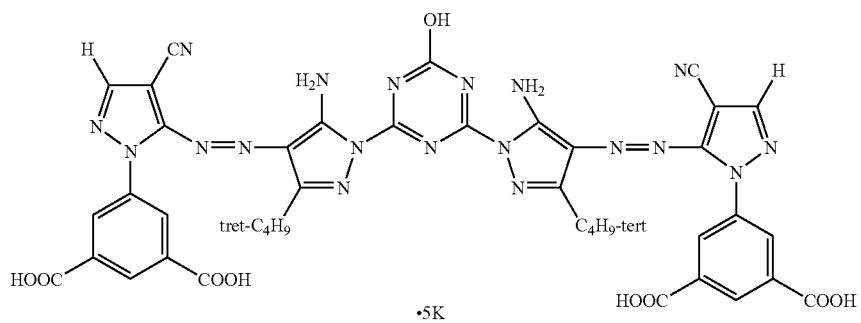

·5K

Example 10

Comparative Example 10

[Preparation of Ink Compositions K1-1 to K1-6, KH1-1, and KH1-2]

Ink compositions K1-1 to K1-6, KH1-1, and KH1-2 were prepared in a manner substantially similar to that in Example 1, except that the formulations of the inks in Example 1 were changed to the formulations shown in the following Table 4. Note that, as a water-soluble dye K1, Direct Black 195 (manufactured by FUJIFILM Imaging Colorants Ltd.) was used.

TABLE 4

| | Ink Composition K1-1 | Ink Composition K1-2 | Ink Composition K1-3 | Ink Composition K1-4 | Ink Composition K1-5 | Ink Composition K1-6 | Ink Composition KH1-1 | Ink Composition KH1-2 |
|---|---|---|---|---|---|---|---|---|
| Water-soluble Dye K1 | 8 | 8 | 8 | 8 | 8 | 8 | 8 | 8 |
| Glycerin | 8 | 8 | 2 | 8 | 38 | 48 | 8 | 2 |
| DEG | 9 | 7 | 1 | 4 | 1 | 1 | 4 | 1 |
| DEGdME | 41 | 30 | 5 | 18 | 3 | 3 | 18 | 5 |
| PG | 12 | 9 | 2 | 5 | 0 | 0 | 5 | 2 |
| 1-Propanol | 0 | 0 | 60 | 20 | 10 | 0 | 0 | 0 |
| OLFINE E1010 | 1 | 1 | 1 | 1 | 1 | 1 | 1 | 1 |
| PROXEL XL II | 0.1 | 0.1 | 0.1 | 0.1 | 0.1 | 0.1 | 0.1 | 0.1 |
| Benzotriazole | 0.002 | 0.002 | 0.002 | 0.002 | 0.002 | 0.002 | 0.002 | 0.002 |
| Water | 20.9 | 36.9 | 20.9 | 35.9 | 38.9 | 38.9 | 55.9 | 80.9 |

Example 11

Comparative Example 11

[Preparation of Ink Compositions K2-1 to K2-6, KH2-1, and KH2-2]

Ink compositions K2-1 to K2-6, KH2-1, and KH2-2 were prepared in a manner substantially similar to that in Example 10, except that 8% by mass of the water-soluble dye K1 in Example 10 was respectively replaced with 7% by mass of a water-soluble dye K2 and 1% by mass of a water-soluble dye K3.

Water-soluble Dye K2:

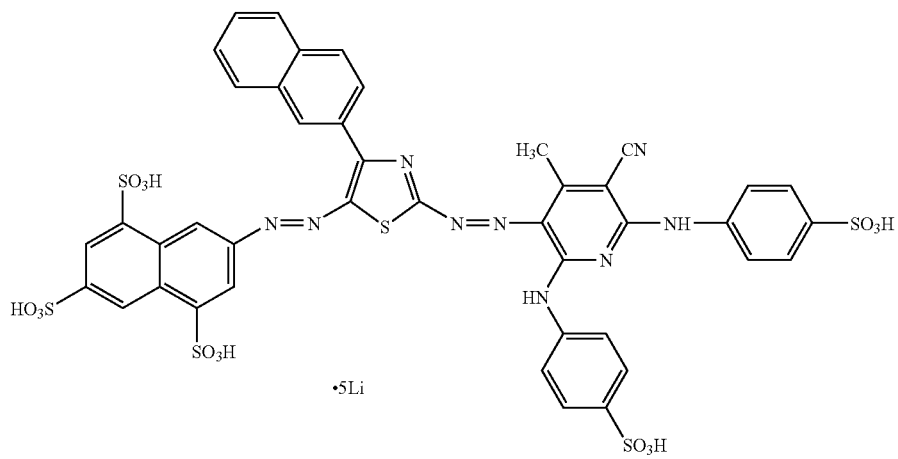

Water-soluble Dye K3:

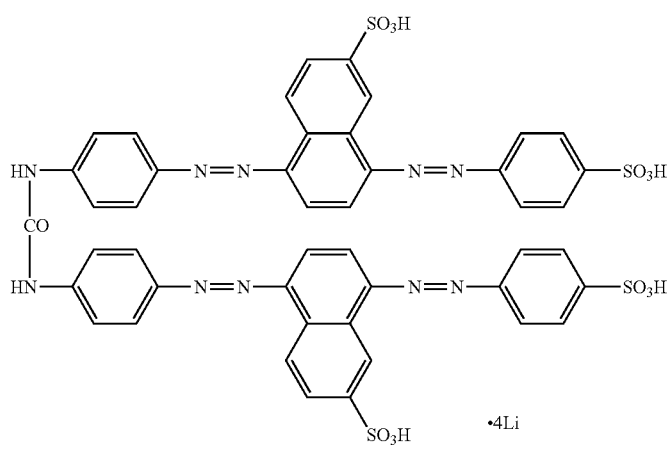

Evaluation

[Refractive Index]

The refractive index of the ink composition obtained above was measured as follows.

The refractive index of the ink at 20° C. was measured with a refractometer Rx-5000α (trade name, manufactured by ATAGO CO., LTD.). The measured value was rounded to two decimal places.

The refractive index of the ink composition before drying was measured for an ink composition that was stored in a sealed bottle at room temperature after the ink was prepared. On the other hand, the refractive index of the ink composition after drying was measured as: an ink composition that was stored in a sealed bottle at room temperature after the ink was prepared was ejected in an amount of 0.5 mL into a glass vessel having a 21 mm diameter bottom; the ink ejected was dried under vacuum (10 Pa to 20 Pa) for 16 hours at 25° C. with a vacuum drier; and then the resulting liquid composition after drying was subjected to the measurement of the refractive index after drying.

The refractive index difference was calculated by subtracting the refractive index of the ink after drying from the refractive index of the ink before drying.

Further, a refractive index difference 2 was calculated by subtracting the refractive index of the ink before drying from the refractive index of the porous particles incorporated in the recording medium.

Image Recording and Evaluation

Print density variation and long time storability were evaluated on the above obtained ink compositions of magenta, cyan, yellow, and black as follows.

Print Density Variation

As described below, each ink composition was evaluated in accordance with the following evaluation criteria after the density variation immediately after printing in a normal humidity environment (print density variation at normal humidity) and the density variation immediately after printing in a high humidity environment (print density variation at high humidity) were calculated respectively.

Note that, an OD value (optical density) was measured with a spectro color meter SPM100-II (trade name, manufactured by Gretag Corp.).

Print Density Variation at Normal Humidity

At an environmental temperature and humidity of 23° C. and 50% RH, with an inkjet printer "PM A-900" (trade name, manufactured by SEIKO EPSON CORP.), printing was performed on an inkjet paper "KASSAI SHASHIN-SHIAGE Hi" (trade name, manufactured by Fiji Photo Film Co., Ltd.). The refractive index of the porous particles incorporated in the ink receiving layer of the inkjet paper was 1.45.

A solid image was printed by using each ink composition while the printing condition was adjusted in a manner that the reflection density in terms of the OD value became 1.8 after the printed image was left for 1 hour at 23° C. and 50% RH.

The OD value that was measured 1 minute later after printing was represented by OD1. Then, after the image was dried by leaving it for 1 hour at 23° C. and 50% RH, the OD value at the same position of the image was measured, which was represented by OD2. The value that is obtained by dividing OD1 by OD2 was used as a print density variation at normal humidity.

Print Density Variation at High Humidity

Substantially similar to the above, except that the environmental temperature and humidity was changed to 23° C. and 80% RH, an OD value 1 minute later after printing was measured and this value was represented by OD1H. Then, after the image was dried by leaving it for 1 hour at 23° C. and 80% RH, the OD value at the same position of the image was measured, which was represented by OD2H. The value that is obtained by dividing OD by OD2H was used as the print density variation at high humidity.

Evaluation Criteria

AA: the print density variation at high humidity was 0.95 or higher and the print density variation at normal humidity is 0.95 or higher.

A: the print density variation at high humidity is less than 0.95 and the print density variation at normal humidity is 0.95 or higher.

C: the print density variation at high humidity is less than 0.95 and the print density variation at normal humidity is less than 0.95.

Long Term Storability of Images

Solid images that exhibit reflection densities of 1.0, 1.3, and 1.6 respectively in terms of the OD value after the images were left for 1 hour at an environmental temperature and humidity of 23° C. and 50% RH after printing were printed respectively at an environmental temperature and humidity of 23° C. and 50% RH.

Chromaticity (a*1, b*1) and luminosity (L1) of the printed images after they were left for 1 hour at 23° C. and 50% RH were measured with a spectro color meter SPM100-II (trade name, manufactured by Gretag Corp.). After that, these images were stored in a box having an ozone gas concentration of 0.5 ppm for 7 days, and then chromaticity (a*2, b*2) and luminosity (L2) were measured.

Note that, the ozone gas concentration in the box was adjusted with an ozone gas monitor (model: OZG-EM-01; trade name) manufactured by APPLICS CO., LTD.

The color difference (ΔE) between before and after exposure to ozone gas was calculated in accordance with the following equation (I).

$$\Delta E = \{(a*1-a*2)^2 + (b*1-b*2)^2 + (L1-L2)^2\}^{1/2} \qquad \text{Equation (I)}$$

Thus obtained color difference (ΔE) at each reflection density was evaluated in accordance with the following evaluation criteria.

Evaluation Criteria

AA: the color difference is less than 5 at every reflection density.

A: the color difference is 5 or higher and less than 10 at any of the reflection densities.

C: the color difference is 10 or higher at any of the reflection densities.

TABLE 5

| Ink Composition | Water Content (%) | R.I.B.D (*1) | R.I.A.D (*2) | D.R.I (*3) | D.R.I.2 (*4) | P.D.V (*5) | L.T.I.S (*6) |
|---|---|---|---|---|---|---|---|
| M1-1 | 20.9 | 1.43 | 1.45 | 0.02 | 0.02 | AA | A |
| M1-2 | 36.9 | 1.41 | 1.45 | 0.04 | 0.04 | AA | A |
| M1-3 | 20.9 | 1.38 | 1.43 | 0.05 | 0.07 | A | A |
| M1-4 | 35.9 | 1.40 | 1.45 | 0.05 | 0.05 | A | A |
| M1-5 | 38.9 | 1.42 | 1.47 | 0.05 | 0.03 | AA | A |
| M1-6 | 38.9 | 1.41 | 1.47 | 0.06 | 0.04 | A | A |
| MH1-1 | 55.9 | 1.38 | 1.46 | 0.08 | 0.07 | C | A |
| MH1-2 | 78.9 | 1.35 | 1.43 | 0.08 | 0.10 | C | A |
| M2-1 | 20.9 | 1.43 | 1.45 | 0.02 | 0.02 | AA | A |
| M2-2 | 36.9 | 1.41 | 1.45 | 0.04 | 0.04 | AA | A |
| M2-3 | 18.9 | 1.38 | 1.43 | 0.05 | 0.07 | A | A |
| M2-4 | 35.9 | 1.40 | 1.45 | 0.05 | 0.05 | A | A |
| M2-5 | 38.9 | 1.42 | 1.47 | 0.05 | 0.03 | AA | A |
| M2-6 | 38.9 | 1.41 | 1.47 | 0.06 | 0.04 | A | A |
| MH2-1 | 55.9 | 1.38 | 1.46 | 0.08 | 0.07 | C | A |
| MH2-2 | 78.9 | 1.35 | 1.43 | 0.08 | 0.10 | C | A |
| M3-1 | 20.9 | 1.43 | 1.45 | 0.02 | 0.02 | AA | AA |
| M3-2 | 36.9 | 1.41 | 1.45 | 0.04 | 0.04 | AA | AA |
| M3-3 | 18.9 | 1.38 | 1.43 | 0.05 | 0.07 | A | AA |
| M3-4 | 35.9 | 1.40 | 1.45 | 0.05 | 0.05 | A | AA |
| M3-5 | 38.9 | 1.42 | 1.47 | 0.05 | 0.03 | AA | AA |
| M3-6 | 38.9 | 1.41 | 1.47 | 0.06 | 0.04 | A | AA |
| MH3-1 | 55.9 | 1.38 | 1.46 | 0.08 | 0.07 | C | AA |
| MH3-2 | 78.9 | 1.35 | 1.43 | 0.08 | 0.10 | C | AA |

In table 5,
(*1): R.I.B.D refers to a refractive index of ink compositions before drying.
(*2): R.I.A.D refers to a refractive index of ink compositions after drying.
(*3): D.R.I refers to a refractive index difference.
(*4): D.R.I2 refers to a refractive index difference 2.
(*5): P.D.V refers to a print density variation.
(*6): L.T.S.I refers to a long term storability of images.

TABLE 6

| Ink Composition | Water Content (%) | R.I.B.D (*1) | R.I.A.D (*2) | D.R.I (*3) | D.R.I2 (*4) | P.D.V (*5) | L.T.I.S (*6) |
| --- | --- | --- | --- | --- | --- | --- | --- |
| C1-1 | 20.9 | 1.43 | 1.45 | 0.02 | 0.02 | AA | A |
| C1-2 | 37.9 | 1.41 | 1.45 | 0.04 | 0.04 | AA | A |
| C1-3 | 20.9 | 1.38 | 1.43 | 0.05 | 0.07 | A | A |
| C1-4 | 34.9 | 1.40 | 1.45 | 0.05 | 0.05 | A | A |
| C1-5 | 38.9 | 1.42 | 1.47 | 0.05 | 0.03 | AA | A |
| C1-6 | 38.9 | 1.41 | 1.47 | 0.06 | 0.04 | A | A |
| CH1-1 | 54.9 | 1.38 | 1.46 | 0.08 | 0.07 | C | A |
| CH1-2 | 80.9 | 1.35 | 1.43 | 0.08 | 0.10 | C | A |
| C2-1 | 20.9 | 1.43 | 1.45 | 0.02 | 0.02 | AA | A |
| C2-2 | 37.9 | 1.41 | 1.45 | 0.04 | 0.04 | AA | A |
| C2-3 | 20.9 | 1.38 | 1.43 | 0.05 | 0.07 | A | A |
| C2-4 | 34.9 | 1.40 | 1.45 | 0.05 | 0.05 | A | A |
| C2-5 | 38.9 | 1.42 | 1.47 | 0.05 | 0.03 | AA | A |
| C2-6 | 38.9 | 1.41 | 1.47 | 0.06 | 0.04 | A | A |
| CH2-1 | 54.9 | 1.38 | 1.46 | 0.08 | 0.07 | C | A |
| CH2-2 | 80.9 | 1.35 | 1.43 | 0.08 | 0.10 | C | A |
| C3-1 | 20.9 | 1.43 | 1.45 | 0.02 | 0.02 | AA | AA |
| C3-2 | 37.9 | 1.41 | 1.45 | 0.04 | 0.04 | AA | AA |
| C3-3 | 20.9 | 1.38 | 1.43 | 0.05 | 0.07 | A | AA |
| C3-4 | 34.9 | 1.40 | 1.45 | 0.05 | 0.05 | A | AA |
| C3-5 | 38.9 | 1.42 | 1.47 | 0.05 | 0.03 | AA | AA |
| C3-6 | 38.9 | 1.41 | 1.47 | 0.06 | 0.04 | A | AA |
| CH3-1 | 54.9 | 1.38 | 1.46 | 0.08 | 0.07 | C | AA |
| CH3-2 | 80.9 | 1.35 | 1.43 | 0.08 | 0.10 | C | AA |

In table 6,
(*1): R.I.B.D refers to a refractive index of ink compositions before drying.
(*2): R.I.A.D refers to a refractive index of ink compositions after drying.
(*3): D.R.I refers to a refractive index difference.
(*4): D.R.I2 refers to a refractive index difference 2.
(*5): P.D.V refers to a print density variation.
(*6): L.T.S.I refers to a long term storability of images.

TABLE 7

| Ink Composition | Water Content (%) | R.I.B.D (*1) | R.I.A.D (*2) | D.R.I (*3) | D.R.I2 (*4) | P.D.V (*5) | L.T.I.S (*6) |
| --- | --- | --- | --- | --- | --- | --- | --- |
| Y1-1 | 22.9 | 1.43 | 1.45 | 0.02 | 0.02 | AA | A |
| Y1-2 | 38.9 | 1.41 | 1.45 | 0.04 | 0.04 | AA | A |
| Y1-3 | 20.9 | 1.38 | 1.43 | 0.05 | 0.07 | A | A |
| Y1-4 | 37.9 | 1.40 | 1.45 | 0.05 | 0.05 | A | A |
| Y1-5 | 39.9 | 1.42 | 1.47 | 0.05 | 0.03 | AA | A |
| Y1-6 | 39.9 | 1.41 | 1.47 | 0.06 | 0.04 | A | A |
| YH1-1 | 57.9 | 1.38 | 1.46 | 0.08 | 0.07 | C | A |
| YH1-2 | 80.9 | 1.35 | 1.43 | 0.08 | 0.10 | C | A |
| Y2-1 | 22.9 | 1.43 | 1.45 | 0.02 | 0.02 | AA | A |
| Y2-2 | 38.9 | 1.41 | 1.45 | 0.04 | 0.04 | AA | A |
| Y2-3 | 20.9 | 1.38 | 1.43 | 0.05 | 0.07 | A | A |
| Y2-4 | 37.9 | 1.40 | 1.45 | 0.05 | 0.05 | A | A |
| Y2-5 | 39.9 | 1.42 | 1.47 | 0.05 | 0.03 | AA | A |
| Y2-6 | 39.9 | 1.41 | 1.47 | 0.06 | 0.04 | A | A |
| YH2-1 | 57.9 | 1.38 | 1.46 | 0.08 | 0.07 | C | A |
| YH2-2 | 80.9 | 1.35 | 1.43 | 0.08 | 0.10 | C | A |
| Y3-1 | 22.9 | 1.43 | 1.45 | 0.02 | 0.02 | AA | AA |
| Y3-2 | 38.9 | 1.41 | 1.45 | 0.04 | 0.04 | AA | AA |
| Y3-3 | 20.9 | 1.38 | 1.43 | 0.05 | 0.07 | A | AA |
| Y3-4 | 37.9 | 1.40 | 1.45 | 0.05 | 0.05 | A | AA |
| Y3-5 | 39.9 | 1.42 | 1.47 | 0.05 | 0.03 | AA | AA |
| Y3-6 | 39.9 | 1.41 | 1.47 | 0.06 | 0.04 | A | AA |
| YH3-1 | 57.9 | 1.38 | 1.46 | 0.08 | 0.07 | C | AA |
| YH3-2 | 80.9 | 1.35 | 1.43 | 0.08 | 0.10 | C | AA |

In table 7,
(*1): R.I.B.D refers to a refractive index of ink compositions before drying.
(*2): R.I.A.D refers to a refractive index of ink compositions after drying.
(*3): D.R.I refers to a refractive index difference.
(*4): D.R.I2 refers to a refractive index difference 2.
(*5): P.D.V refers to a print density variation.
(*6): L.T.S.I refers to a long term storability of images.

TABLE 8

| Ink Composition | Water Content (%) | R.I.B.D (*1) | R.I.A.D (*2) | D.R.I (*3) | D.R.I.2 (*4) | P.D.V (*5) | L.T.I.S (*6) |
|---|---|---|---|---|---|---|---|
| K1-1 | 20.9 | 1.43 | 1.45 | 0.02 | 0.02 | AA | A |
| K1-2 | 36.9 | 1.41 | 1.45 | 0.04 | 0.04 | AA | A |
| K1-3 | 20.9 | 1.38 | 1.43 | 0.05 | 0.07 | A | A |
| K1-4 | 35.9 | 1.40 | 1.45 | 0.05 | 0.05 | A | A |
| K1-5 | 38.9 | 1.42 | 1.47 | 0.05 | 0.03 | AA | A |
| K1-6 | 38.9 | 1.41 | 1.47 | 0.06 | 0.04 | A | A |
| KH1-1 | 55.9 | 1.38 | 1.46 | 0.08 | 0.07 | C | A |
| KH1-2 | 80.9 | 1.35 | 1.43 | 0.08 | 0.10 | C | A |
| K2-1 | 20.9 | 1.43 | 1.45 | 0.02 | 0.02 | AA | A |
| K2-2 | 36.9 | 1.41 | 1.45 | 0.04 | 0.04 | AA | A |
| K2-3 | 20.9 | 1.38 | 1.43 | 0.05 | 0.07 | A | A |
| K2-4 | 35.9 | 1.40 | 1.45 | 0.05 | 0.05 | A | A |
| K2-5 | 38.9 | 1.42 | 1.47 | 0.05 | 0.03 | AA | A |
| K2-6 | 38.9 | 1.41 | 1.47 | 0.06 | 0.04 | A | A |
| KH2-1 | 55.9 | 1.38 | 1.46 | 0.08 | 0.07 | C | A |
| KH2-2 | 80.9 | 1.35 | 1.43 | 0.08 | 0.10 | C | A |

In table 8,
(*1): R.I.B.D refers to a refractive index of ink compositions before drying.
(*2): R.I.A.D refers to a refractive index of ink compositions after drying.
(*3): D.R.I refers to a refractive index difference.
(*4): D.R.I2 refers to a refractive index difference 2.
(*5): P.D.V refers to a print density variation.
(*6): L.T.S.I refers to a long term storability of images.

Ink Set Evaluation

Next, ink sets 1 to 15 were prepared by combining the above obtained ink compositions in a manner as shown in Table 9. Evaluation was carried out substantially similar to the above evaluations for the density variation immediately after printing, the print density variation at high humidity, and the long time storability of images, except that gray solid images were printed by using each ink set obtained as above.

Gray Balance Variation

Gray color solid images were printed in an environmental temperature and humidity of 23° C. and 50% RH while the printer was adjusted in a manner that the printed image left for 1 hour at 23° C. and 50% RH provided an OH value of 0.5 and a visual color of gray. The hue of the printed image 1 minute later after printing was visually observed and evaluated in accordance with the following evaluation criteria.

Evaluation Criteria

AA: gray color was recognized by visual observation.
A: other color slightly appeared, but gray color was recognized by visual observation.
C: a color other than gray color was recognized by visual observation.

TABLE 9

| | Yellow Ink Composition | Magenta Ink Composition | Cyan Ink Composition | Black Ink Composition | P.D.V (*5) | G.B.V (*7) | L.T.I.S (*6) | NOTE |
|---|---|---|---|---|---|---|---|---|
| Ink set 1 | Y1-2 | M1-2 | CH1-1 | KH1-1 | A | AA | A | Invention |
| Ink set 2 | Y1-2 | MH1-1 | C1-2 | KH1-1 | A | A | A | Invention |
| Ink set 3 | Y1-2 | MH1-1 | CH1-1 | K1-1 | A | A | A | Invention |
| Ink set 4 | YH1-1 | M1-2 | C1-2 | KH1-1 | AA | AA | A | Invention |
| Ink set 5 | YH1-1 | M1-2 | CH1-1 | K1-1 | A | AA | A | Invention |
| Ink set 6 | YH1-1 | MH1-1 | C1-2 | K1-1 | A | A | A | Invention |
| Ink set 7 | Y1-2 | M1-2 | C1-2 | K1-1 | AA | AA | A | Invention |
| Ink set 8 | Y3-2 | M3-2 | CH3-1 | KH2-1 | A | AA | AA | Invention |
| Ink set 9 | Y3-2 | MH3-1 | C3-2 | KH2-1 | A | A | AA | Invention |
| Ink set 10 | Y3-2 | MH3-1 | CH3-1 | K2-1 | A | A | AA | Invention |
| Ink set 11 | YH3-1 | M3-2 | C3-2 | KH2-1 | AA | AA | AA | Invention |
| Ink set 12 | YH3-1 | M3-2 | CH3-1 | K2-1 | A | AA | AA | Invention |
| Ink set 13 | YH3-1 | MH3-1 | C3-2 | K2-1 | A | A | AA | Invention |
| Ink set 14 | Y3-2 | M3-2 | C3-2 | K2-1 | AA | AA | AA | Invention |
| Ink set 15 | YH1-1 | M3-1 | CH1-1 | KH1-1 | C | C | C | Comparative |

In table 9,
(*5): P.D.V refers to a print density variation.
(*6): L.T.S.I refers to a long term storability of images.
(*7): G.B.V refers to a gray balance variation of images.

Tables 5 to 9 show that the ink composition of the present invention allows the density variation immediately after printing to be suppressed. In addition, the ink set of the present invention is shown to allow the density variation immediately after printing to be suppressed and exhibit an excellent gray balance.

Further, the water soluble dye that has a specific structure and is incorporated as a color material in the ink composition of the present invention is shown to allow printed images to exhibit an excellent stability upon long term storage.

According to the present invention, an ink composition capable of recording an image that is suppressed in the variation of image density immediately after printing, an ink set that includes the ink composition, and an image recording method using the ink composition are provided.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An inkjet recording ink composition comprising:
   a water-soluble dye;
   a water-soluble organic solvent; and
   water in an amount of from 20% by mass to 40% by mass with respect to a total mass of the ink composition,
   wherein the water-soluble organic solvent comprises:
   a first water-soluble organic solvent comprising a volatile water-soluble organic solvent having a refractive index in a range of from 1.36 to 1.54,
   a second water-soluble organic solvent that is a nonvolatile water-soluble organic solvent comprising at least one selected from the group consisting of ethylene glycol diethyl ether, diethylene glycol dimethyl ether, diethylene glycol ethyl methyl ether, propylene glycol dimethyl ether and propylene glycol diethyl ether, and
   wherein a content of the second water-soluble organic solvent is in a range of from 20% by mass to 60% by mass with respect to the total mass of the ink composition.

2. The ink composition according to claim 1, wherein the difference between a refractive index of the ink composition after drying when a volatile component of the ink composition has been removed, and a refractive index of the ink composition before drying when the volatile component has not been removed, is 0.05 or less.

3. The ink composition according to claim 2, wherein the refractive index of the ink composition before drying is in a range from 1.39 to 1.45.

4. The ink composition according to claim 1, further comprising an aliphatic monohydric alcohol, having 1 to 4 carbon atoms, in an amount of from 10% by mass to 60% by mass with respect to a total mass of the ink composition.

5. The ink composition according to claim 1, wherein a total content of the water-soluble organic solvent is in a range of from 20% by mass to 60% by mass with respect to the total mass of the ink composition.

6. The ink composition according to claim 1, wherein the water-soluble dye is a water-soluble magenta dye.

7. The ink composition according to claim 1, wherein the water-soluble dye is a water-soluble cyan dye.

8. An ink set comprising two or more ink compositions according to claim 1.

9. An ink set comprising:
   a first ink composition according to claim 1, wherein the water-soluble dye is a water-soluble magenta dye; and
   a second ink composition according to claim 1, wherein the water-soluble dye is a water-soluble cyan dye.

10. An image recording method comprising recording an image by applying the ink composition according to claim 1 onto a recording medium using an inkjet system, the recording medium comprising:
    a support; and
    an ink receiving layer which is disposed on the support and includes porous particles, an absolute value of the difference between a refractive index of the porous particles, and a refractive index of the ink composition before drying, being 0.05 or less.

* * * * *